May 6, 1930. A. T. POTTER 1,757,474
WINDSHIELD OPERATING DEVICE
Filed Jan. 21, 1928 2 Sheets-Sheet 1
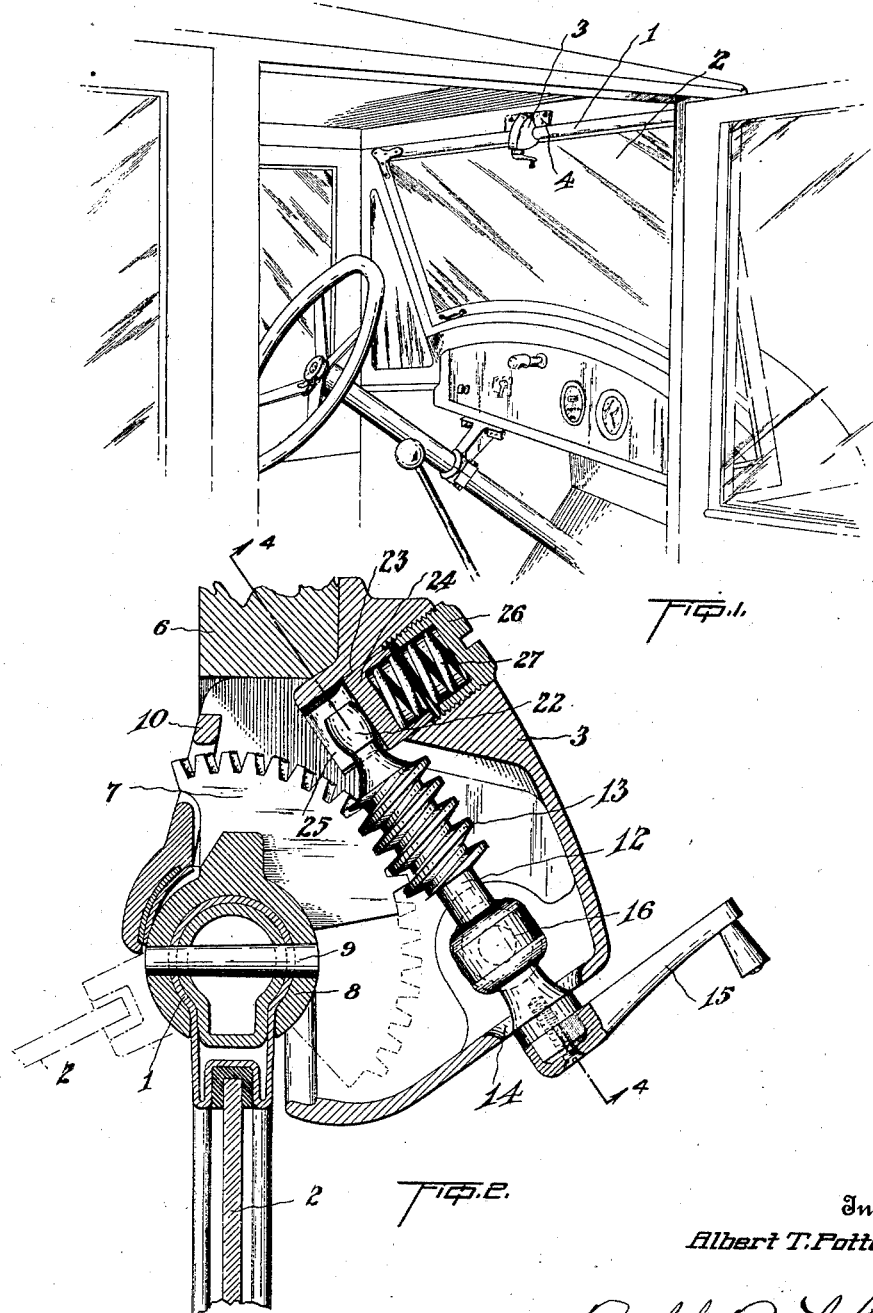
Inventor
Albert T. Potter
By
Attorney May 6, 1930.  A. T. POTTER  1,757,474
WINDSHIELD OPERATING DEVICE
Filed Jan. 21, 1928  2 Sheets-Sheet 2
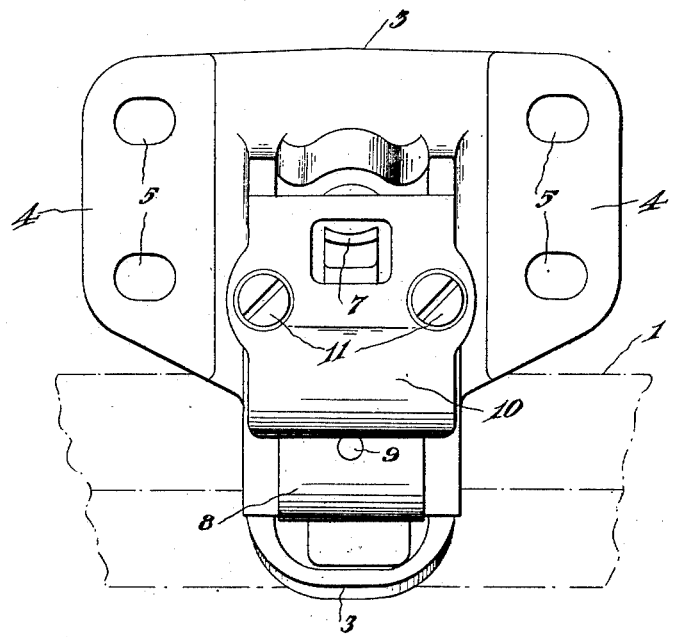
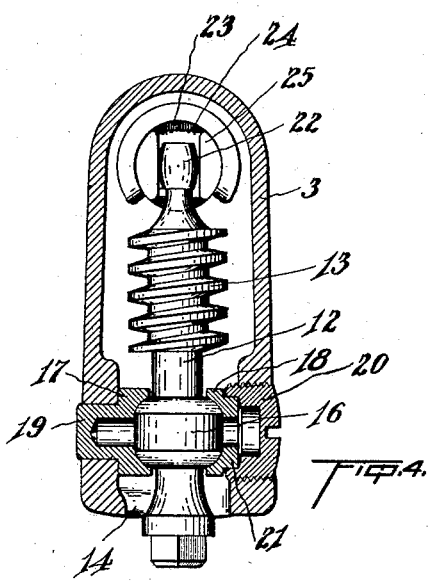
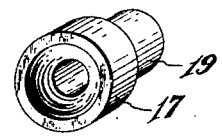
Inventor
Albert T. Potter
By
Attorney Patented May 6, 1930

1,757,474

UNITED STATES PATENT OFFICE

ALBERT T. POTTER, OF DETROIT, MICHIGAN, ASSIGNOR, BY MESNE ASSIGNMENTS, TO AINSWORTH MANUFACTURING CORPORATION, OF DETROIT, MICHIGAN, A CORPORATION OF MICHIGAN

WINDSHIELD-OPERATING DEVICE

Application filed January 21, 1928. Serial No. 248,364.

This invention relates to a device for swinging a panel of an automobile windshield and its object is to provide a simplified construction which is cheap to manufacture and efficient in operation, and wherein ease and facility of adjustment is secured. A further object is to provide an arrangement whereby easy swinging of the windshield panel is effected through the operation of a worm shaft in mesh with a worm sector and vibration of the panel is prevented through the adjustment of the worm shaft into firm engagement with the sector, the arrangement being such as to facilitate such adjustments and provide efficient adjustable bearings for the worm shaft within which said shaft is mounted for rotation with a minimum of frictional resistance. It is also an object to provide certain other new and useful features in the construction and arrangement, all as will hereinafter more fully appear.

With the above and other ends in view, the invention consists in the matters hereinafter set forth and more particularly pointed out in the appended claim, reference being had to the accompanying drawings in which Figure 1 is a perspective view of the front end portion of an automobile body showing the application to the windshield thereof of a device embodying the present invention;

Fig. 2 is an enlarged transverse section through the device;

Fig. 3 is a rear end elevation of the device;

Fig. 4 is a section substantially upon the line 4—4 of Fig. 2, and

Fig. 5 is a perspective view of a cupped bearing member, detached.

The present invention relates to a windshield operating device of the character disclosed in my application for Letters Patent filed Feb. 4, 1927, under Serial No. 165,798 and relates to a modified and improved construction of the device shown in said application.

This device is applied to the frame of a windshield or other suitable support, adjacent the upper horizontal edge or frame member 1 of the windshield panel 2, said device comprising a suitable casing 3 having laterally extending ears 4 provided with openings 5 to receive bolts for securing the casing to the frame member 6 of the automobile top or body or windshield supporting frame adjacent the frame member 1. The windshield panel 2 is pivotally supported in the usual manner, the ends of the frame member 1 being pivotally supported within the supporting frame of the windshield, and to swing the panel upon its pivotal support, a worm segment 7 is secured to the member 1 of the panel frame, in any suitable manner as by providing the segment with a hub 8 to fit over and receive the frame member and secured thereto by a transverse pin 9.

The side of the casing 3 adjacent the wind shield panel, is open and this open side is partially closed by a plate 10 which is secured to the casing over the opening by means of screws 11. Within the casing is a worm shaft 12 having a screw thread 13 to engage the segment 7 and one end of this shaft projects through an opening 14 in the rear end of the casing and is provided with an operating handle 15 by means of which the operator may rotate the shaft 12 and through the engagement of its worm or screwthread with the worm sector, swing the panel 2 to the desired position.

The shaft 12 is mounted in the casing within bearings therefor so that said worm shaft may rotate freely and may be adjusted laterally to bring its worm thread 13 into firm engagement with the worm teeth of the sector 7. Such adjustment of the worm shaft is necessary in order to prevent vibration of the windshield panel for, as the worm threads wear in use, there is a slight play between the segment and worm shaft, which would permit the panel 2 to turn slightly, setting up a vibration during the travel of the automobile, but by adjusting the worm shaft into firm engagement with the segment, this play is taken up and such vibration prevented.

To mount the worm shaft so that it may be freely rotated by the operator and also so that it may be quickly and easily adjusted laterally, said shaft 12 is provided adjacent the opening 14 with a ball portion 16 or enlargement which in effect is that of a ball, and this ball is engaged by suitable cup members 17 and 18 set in the casing 3 at opposite sides of the enlargement 16, the cup member 17 having a cylindrical stud portion 19 to closely fit within an opening in one side of the casing and thus support the cup in position to receive the enlargement. In the opposite side of the casing is a screwthreaded opening to receive a screw plug 20 and this plug has an inner end seat or bore to receive a cylindrical projecting portion 21 on the cup member 18. The plug 20 is of greater diameter than the extreme diameter of the cup 18 so that after the shaft 12 is in place with the enlargement 16 engaged by the cup 17, the cup 18 may be inserted through the opening for the plug 20 and the plug 20 then screwed into place and into engagement with the cup 18 to hold said cup and bring it into engagement with the enlargement 16 at the side thereof opposite that engaged by the cup 17. The rear or handle end of the shaft 12 is thus firmly mounted within the casing so that it is free to rotate and it is free to yield laterally in any desired direction, the enlargement and cups forming a universal bearing support for this end of the shaft.

The opposite or inner end of the shaft 12 is formed with a rounded or ball shaped head 22 and the casing 3 is formed with a bore 23 to receive a cylindrical bearing member 24 adapted to slide within the bore and having at its inner end, end lugs 25 between which the head 22 is received, the space between the adjacent sides of the lugs being equal to the diameter of the head 22 to prevent lateral play or movement of the head between these lugs. The outer end of the bore 23 is screwthreaded and into this outer end is screwed a hollow plug 26 with a coiled spring 27 within the hollow plug and the outer tubular end of the bearing member, to exert a yielding force for moving the bearing member inwardly into firm engagement with the head 22 and thus yieldingly holding the worm shaft in firm engagement with the sector 7. As the head 22 has a line contact with the bearing member between the lugs 25, the shaft is supported to turn freely and at the same time is rigidly held against lateral movement and is yieldingly held in firm engagement with the segment. When the segment teeth or the worm thread become worn so that there is a slight play, the shaft is adjusted toward the sector by simply screwing the plug 26 inwardly and thus increasing the pressure of the spring 27 against the bearing member 24, and thus rocking the shaft about its enlargement 16 toward the segment 7. A very quick and easy adjustment of the worm shaft is thus effected and the particular construction and arrangement of bearings for said shaft gives free adjustment and provides simplicity and cheapness of construction.

This operating device may be quickly and easily applied to the windshield as the segment 9 will be assembled upon and secured to the frame member 1 of the windshield panel when said panel is mounted in its frame and the casing 3 with its shaft 12 mounted therein, may then be secured in place over the segment, the segment entering the casing and being brought into engagement with the worm shaft, through an open side of the casing, and then this open side closed by securing the plate 10 in place thereover after the casing has been secured to and properly adjusted upon the frame member 6. Any wear of the ball and cup bearing for the shaft may be readily taken up by simply adjusting the screw plug 20 and the engagement of the worm shaft with the worm sector may also be quickly effected by adjusting the plug 26.

Obviously changes may be made in the construction and arrangement of parts, within the scope of the appended claims without departing from the spirit of the invention and I do not therefore limit myself to the particular construction shown.

Having thus fully described my invention what I claim is:

A device of the character described comprising a worm segment adapted to be secured to a pivoted windshield panel, a casing adapted to be secured over said segment, a worm shaft in said casing in engagement with said segment, a ball shaped enlargement on said shaft, bearing cup members mounted in the walls of said casing and fitted against opposite sides of said enlargement to provide a socket for said enlargement, and bearing means at another point on said shaft.

In testimony whereof I affix my signature.

ALBERT T. POTTER.